(12) United States Patent
Vayssiere

(10) Patent No.: US 8,429,673 B2
(45) Date of Patent: Apr. 23, 2013

(54) SYSTEMS AND METHODS OF ACCESSING INFORMATION ACROSS DISTRIBUTED COMPUTING COMPONENTS

(75) Inventor: Julien J. P. Vayssiere, West End (AU)

(73) Assignee: SAP AG, Walldorf (DE)

( * ) Notice: Subject to any disclaimer, the term of this patent is extended or adjusted under 35 U.S.C. 154(b) by 1914 days.

(21) Appl. No.: 11/411,597

(22) Filed: Apr. 26, 2006

(65) Prior Publication Data

US 2007/0256083 A1    Nov. 1, 2007

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ................... 719/315; 719/316; 719/330

(58) Field of Classification Search .................. None
See application file for complete search history.

(56) References Cited

U.S. PATENT DOCUMENTS

| 2003/0061404 | A1* | 3/2003 | Atwal et al. ................. 709/328 |
| 2005/0203949 | A1* | 9/2005 | Cabrera et al. ............ 707/103 R |
| 2006/0242292 | A1 | 10/2006 | Carter |
| 2007/0150595 | A1 | 6/2007 | Bhorania et al. |

FOREIGN PATENT DOCUMENTS

WO    2007/028134 A    3/2007

OTHER PUBLICATIONS

The Mitre Corporation; "HTTP Extensions for Resource Metadata (HERM)"; xfront.com; Feb. 17, 2003; pp. 1-10.
Wahli et al; "WebSphere Version 6"; IBM Redbooks; Mar. 2, 2005; pp. 155-172.
Jacek Kopeck et al; "Aligning WSMO and WSMX with existing Web Services specifications"; wsmo.org; Nov. 26, 2004; pp. 1-12.
Keith Ballinger et al; "Web Services Metadata Exchange"; Sep. 2004.
Martin Gudgin et al; "Web Services Addressing 1.0-WSDL Binding"; w3.org; Feb. 16, 2006; pp. 1-29.
Clint Boulton; "Web Services Now and When"; internetnews.com/dev-news/article.php/3441211.
Vangie Beal; "Understanding Web Services"; webopedia.com; Oct. 7, 2005, pp. 1-9.
C. Matthew Mackenzie et al, "Oasis-Service Oriented Architecture Reference Model", URL: oasis-open.org/committees/download.php/12601/wd-soa-rm-07.pdf,May 12, 2005, p. 1-42.

* cited by examiner

*Primary Examiner* — Hyung S. Sough
*Assistant Examiner* — Kimberly Jordan
(74) *Attorney, Agent, or Firm* — Fountainhead Law Group PC

(57) ABSTRACT

In one embodiment the present invention includes a systems and methods of accessing information across distributed computing components. In one embodiment, a first software component has associated information and references to information associated with other software components that provide inputs to the first software component. Information about downstream software components may be accessed through the references. In one embodiment, a first software service such as a web service may include metadata that describes the service and pointers to other services consumed by the first software service. Embodiments of the invention provide automated auditing and searching across related software components.

46 Claims, 13 Drawing Sheets

400

1210 main function

1211 — for each software service consumed by the requestor {
    audit_service (software service);
}

---

1220 audit_service function (software service)

1221 — request dataset from software service;

1222 — receive dataset from software service;

1223 — if dataset contains a list of pointers to other software services consumed by this software service {
    for each pointer in the list {
        audit_service (software service pointed to by pointer);
    }
}

*FIG. 12*

SYSTEMS AND METHODS OF ACCESSING INFORMATION ACROSS DISTRIBUTED COMPUTING COMPONENTS

BACKGROUND

The present invention relates to distributed computing, and in particular, to systems and methods of accessing information across distributed computing components, such as software services.

With the ever increasing demand for software functionality, the size of software programs continues to grow. Historically, software programs were written as large monolithic blocks of code that could be compiled and executed as a single unit. However, as programs grew in size, distributed computing architectures became more prevalent. In a distributed computing architecture, a program may be divided into components, each of which may implement some particular functionality of the program. FIG. 1 illustrates a distributed computing architecture. In FIG. 1, a software program 100 includes numerous software components A-H. The software components may interoperate in a variety of ways to define the overall behavior of the program. In many instances, particular software components may require inputs from other components to perform their functions. For example, software component A 102 may require inputs from software component B 104 to implement its functionality. Similarly, software component B 104 may receive inputs from software components C, D, and E to implement its functionality. Likewise, software component C 110 may require inputs from software component F 120 and software component G 122, and software component D 112 may require input from software component H 130. This example illustrates that the operation of software component A may depend directly on the behavior of another component B that provides direct inputs to component A. Moreover, the operation of component A may depend indirectly on the behavior of other components C-H that provide inputs to component B (directly or indirectly), which is providing an input to component A.

In many instances, it is desirable for component A to obtain information about other components that are providing inputs to component B. For example, in some applications it may be desirable for component A to obtain information that describes various aspects of downstream components C-H. In one embodiment, the present invention provides a technique for a software component to obtain information about other software components in the system that indirectly provide inputs to such software component.

An illustrative example of the shortcomings of traditional distributed computing techniques is the area of software services. With the ever increasing demand for software features, many companies are embracing the use of software as a service. Traditionally, software was sold on CDs in shrink-wrapped boxes or as installer files downloadable from a Web site. The software was then installed on a system controlled by the customer and operated under the authority of the customer. In contrast, with software services, customers no longer buy software that they can install and run. Rather, a customer may buy the right to use a piece of software running on a system operated by a third party. In many applications, software services operated by third parties use other software services operated by yet other parties. Thus, software services are an example of a distributed computing architecture.

FIG. 2 illustrates a typical configuration of distributed software services. An application component 201 may use a software service component 203 during operation. Accordingly, component 201 may make "requests" to service component 203. However, before the requestor 201 may send its request, the requestor may be required to know certain information about the software service 203. Typically, software services make certain information that describes the service available to applications using the service. For example, some software components or services may only expose an interface for using the component or service, while hiding the implementation of the component or service. Thus, some components or services may be seen as a black box that can only be accessed through a certain interface. In practice, the only thing that a provider needs to communicate to the consumer is a set of technical artifacts that document how to access the service. These technical artifacts, which may be stored as metadata, often play the role of a limited form of "interaction contract" between the service provider and the service consumer. One example of such metadata is a service interface (i.e. which functionalities are offered by the service provider along with documents detailing how to call them and which data formats should be used for communication). Referring to the example in FIG. 2, service 203 may expose metadata 205 so that requestor component 201 can request the metadata 205. After receiving metadata 205, requestor 201 may send a job to software service 203 for execution and receive back results that may act as inputs to the requester application.

In some systems, service component 203 may further use the resources of other service components, such as components 207 and 211, to perform their functions. For example, as an application in service A is processing the request from the requestor 201, it discovers that it needs to contact service providers service B 207 and service C 211 for their services. Service A requests and receives service B's metadata 209 and service C's metadata 213 in a similar manner as the requester received the metadata from service A above. After receiving the metadata, service A sends jobs to service B and service C. Service B does not consume any services so it does not require any services to complete its job. After completing its job, service B sends a response back to service A. Service C, on the other hand, uses service D 215. Thus, service C requests and receives service D's metadata 217. After the exchange, service C sends a job to service D. Like service B, service D does not require any services to complete its job. Service D completes its job and sends a response back to service C. After receiving the response from service D, service C is now able to complete its job. Service C then sends a response to Service A. Now that Service A has all the information necessary to complete the request, it finishes its job and sends a response to the requestor 201.

One problem with existing distributed computing technologies is that the components in the system have no efficient formal mechanism for sharing information between indirectly related components. In the context of software services, there is currently no efficient mechanism by which requestor services can obtain information that describes services that are used indirectly to process jobs. Accordingly, users of software services lose visibility and control over how some parts of their software are executed. In some cases, software service users may want to inspect how the service handles the protection and privacy of their confidential data, for example, and may want to audit all components used directly and indirectly in processing data. Unfortunately, there is currently no formal mechanism for auditing indirect software services.

Thus, there is a need for improved mechanisms for accessing information about components in a distributed computing environment. The present invention solves these and other

SUMMARY

In one embodiment, the present invention includes a computer-implemented method of accessing information from one or more software components comprising storing a first information that describes a first software component, associating the first information with the first software component, storing reference information that specifies the address of second information associated with a second software component, wherein the second information describes the second software component, associating the reference information with the first software component, and sending the first information and the reference information, or a reference to one or both of the first information and the reference information, to a third software component, wherein the first software component provides one or more inputs to the third software component, and the first software component receives one or more inputs from the second software component.

In one embodiment, the third software component uses at least a portion of the functionality of the first software component.

In one embodiment, the first software component uses at least a portion of the functionality of the second software component.

In one embodiment, the third software component accesses the second information associated with a second software component using the first reference information.

In one embodiment, the first software component and the second software component are remotely accessible applications.

In one embodiment, the first software component, the second software component, and the third software component are instantiated objects having corresponding classes.

In one embodiment, the first software component and the second software component are components of a single software program.

In one embodiment, the first software component and the second software component are software services.

In one embodiment, the first software component and the second software component are web services.

In one embodiment, the first software component is a software service, the first information is metadata that describes the first software service, and the reference information comprises one or more pointers to other software services consumed by the first software service.

In one embodiment, the first software component includes the first information and the reference information, and wherein the method further comprises sending the first information and the reference information from the first software component to the third software component in response to at least one request from the third software component.

In one embodiment, the first information is stored external to the first software component, wherein the first information is associated with the first software component using a reference to the first information, wherein the reference is stored with the first software component, and wherein the first software component sends the reference to the third software component.

In one embodiment, the reference information is stored external to the first software component, wherein the reference information is associated with the first software component using a reference to the reference information, wherein the reference is stored with the first software component, and wherein the first software component sends the reference to the third software component.

In one embodiment, the reference information is an address.

In one embodiment, the reference information is represented in XML.

In one embodiment, the reference information is represented in a web service description language.

In one embodiment, the method further comprises receiving a request in the first software component from the third software component, where the request includes a restriction on the type of information to be accessed, and the type is a reference type.

In one embodiment, the restriction comprises a unique resource identifier.

In one embodiment, the reference information is used by the third software component to access information that describes an interface for one or more software components consumed by the first software component.

In one embodiment, the reference information is used by the third software component to access information that describes one or more data formats for one or more software components consumed by the first software component.

In one embodiment, the reference information is used by the third software component to access reliability information for one or more software components consumed by the first software component.

In one embodiment, the reference information is used by the third software component to access security information for one or more software components consumed by the first software component.

In one embodiment, the reference information is used by the third software component to access attributes of one or more software components consumed by the first software component.

In one embodiment, the reference information is used by the third software component to access second reference information, and wherein the second reference information specifies one or more addresses for information that describes a corresponding one or more software components consumed by the second software component.

In another embodiment, the present invention includes a computer-implemented method of accessing information from one or more software services comprising receiving a request from a first software service in a second software service, and sending first metadata and first reference information from the second software service to the first software service in response to the request, wherein the first metadata describes the second software service and the first reference information specifies the address of second metadata that describes a third software service.

In one embodiment, the method further comprises receiving the first reference information in the first software service.

In one embodiment, the first software service accesses the second metadata from the third software service using the reference information.

In one embodiment, the first reference information is used by the first software service to access information that describes an interface for one or more software service consumed by the second software service.

In one embodiment, the first reference information is used by the first software service to access information that describes one or more data formats for one or more software services consumed by the second software service.

In one embodiment, the first reference information is used by the first software service to access reliability information for one or more software services consumed by the second software service.

In one embodiment, the first reference information is used by the first software service to access security information for one or more software services consumed by the second software service.

In one embodiment, the first reference information is used by the first software service to access attributes of one or more software services consumed by the second software service.

In one embodiment, the first reference information is used by the first software service to access second reference information, and wherein the second reference information specifies one or more addresses for information that describes a corresponding one or more software services consumed by the third software service.

In one embodiment, the first reference information comprises one or more pointers.

In one embodiment, the first reference information comprises a type classification for distinguishing the first reference information from other information.

In one embodiment, the first reference information is represented in XML.

In one embodiment, the first software service, the second software service, and the third software service are web services.

In one embodiment, the first software service is a consumer of the second software service.

In one embodiment, the second software service is a consumer of the third software service and a producer for the first software service.

In one embodiment, the third software service is a producer for the second software service.

In another embodiment, the present invention includes a computer-implemented method of accessing information across software components comprising accessing a second software component from a first software component receiving, in the first software component, first reference information that specifies the address of first information, wherein the first information describes a third software component, and wherein the third software component provides one or more inputs to the second software component, accessing the third software component using the first reference information, and receiving the first information that describes the third software component.

In one embodiment, the method further comprises receiving a second information that describes the second software component.

In one embodiment, the method further comprises receiving second reference information from the third software component that specifies the address of second information, wherein the second information describes a fourth software component, and wherein the fourth software component provides one or more inputs to the third software component, accessing the fourth software component using the second reference information, and receiving the second information that describes the fourth software component.

In one embodiment, the first software component, the second software component, the third software component, and the fourth software component are software services.

In one embodiment, the first software component, the second software component, the third software component, and the fourth software component are web services.

In one embodiment, the first software component accesses the second software component by sending a first request, and the first software component accesses the third software component by sending a second request.

In one embodiment, the first reference information comprises one or more pointers to the third software component.

In another embodiment, the present invention includes a computer software system for accessing information across software components comprising a producer software component which comprises a first component logic, first information corresponding to the producer software component, and at least one reference to second information corresponding to a second software component, wherein the producer software component is consumed by a consumer software component, wherein the producer software component consumes the second software component, and at least one reference in the producer software component is obtained by the consumer software component to access second information corresponding to the second software component.

In one embodiment, the computer software system further comprises an interface for accessing the first component logic, the first information, and one or more references.

In one embodiment, the consumer software component, the producer software component, and the second software component are software services.

In one embodiment, first information is metadata that describes the producer software component and at least one reference is a pointer for accessing information in the second software component.

In one embodiment, the consumer software component, the producer software component, and the second software component are web services.

The following detailed description and accompanying drawings provide a better understanding of the nature and advantages of the present invention.

BRIEF DESCRIPTION OF THE DRAWINGS

FIG. 12 illustrates example pseudo-code for accessing information recursively according to one embodiment of the present invention.

DETAILED DESCRIPTION

Described herein are techniques for accessing information across distributed computing components. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
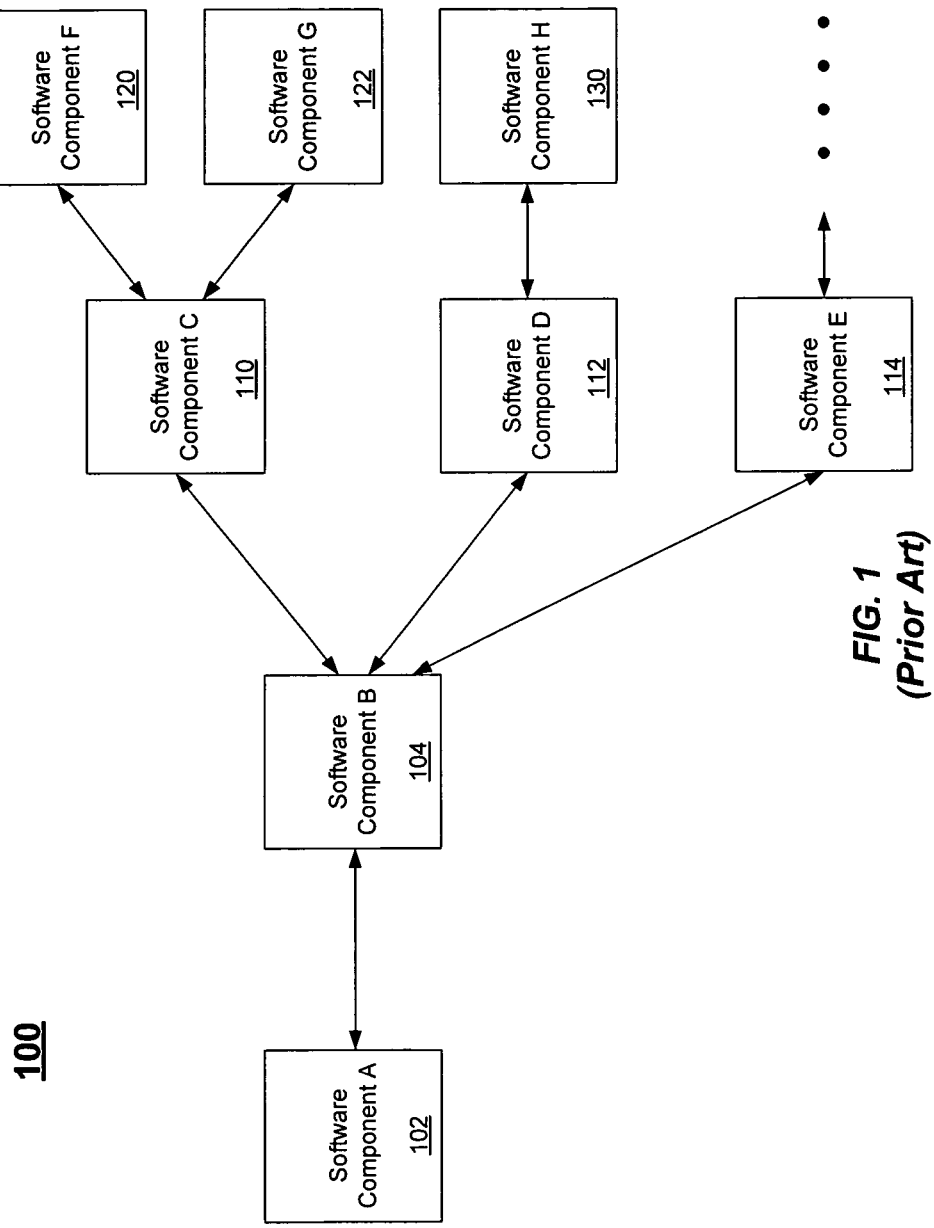
FIG. 1 illustrates a distributed computing architecture.
Figure 2:
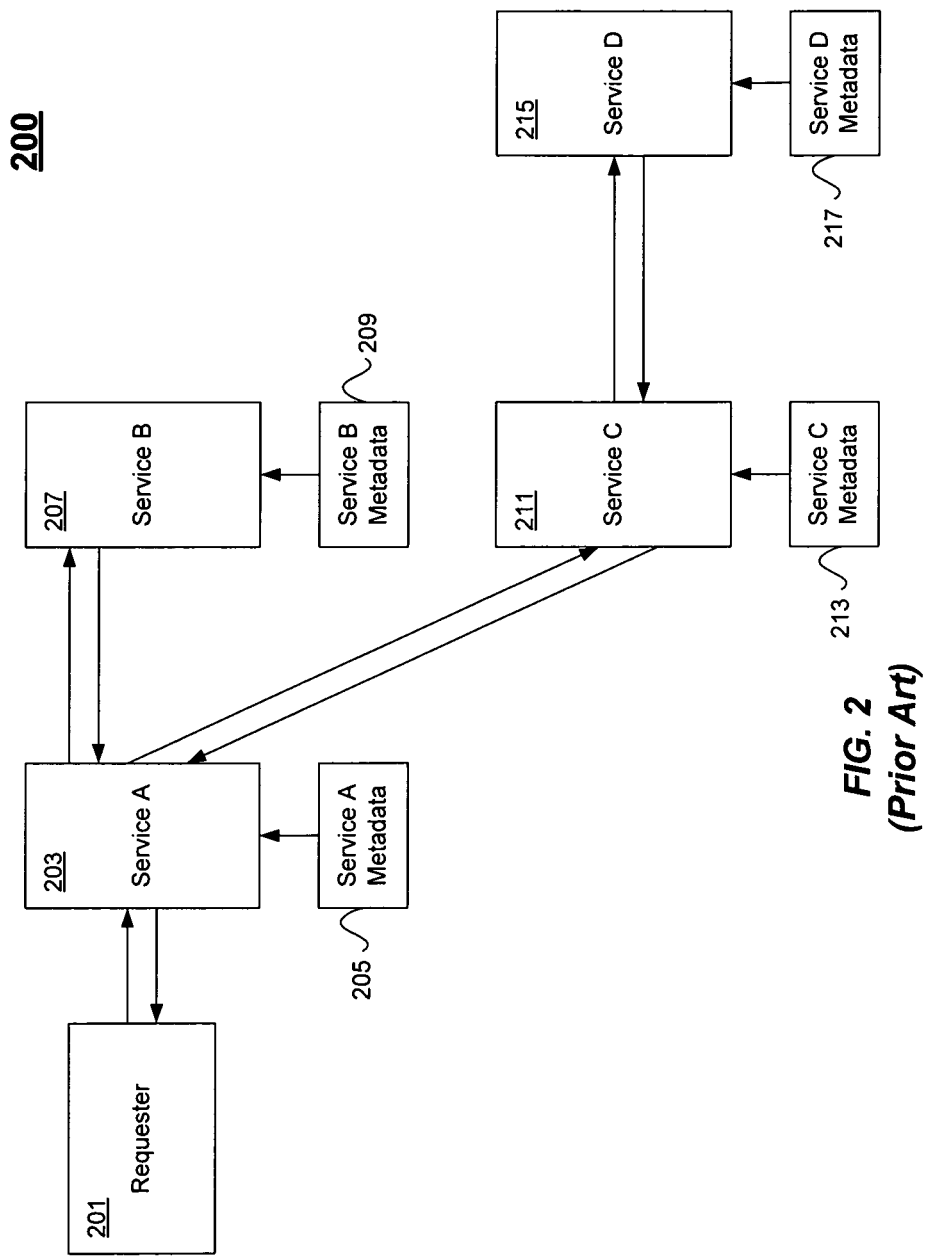
FIG. 2 illustrates a typical configuration of software services.
Figure 3:
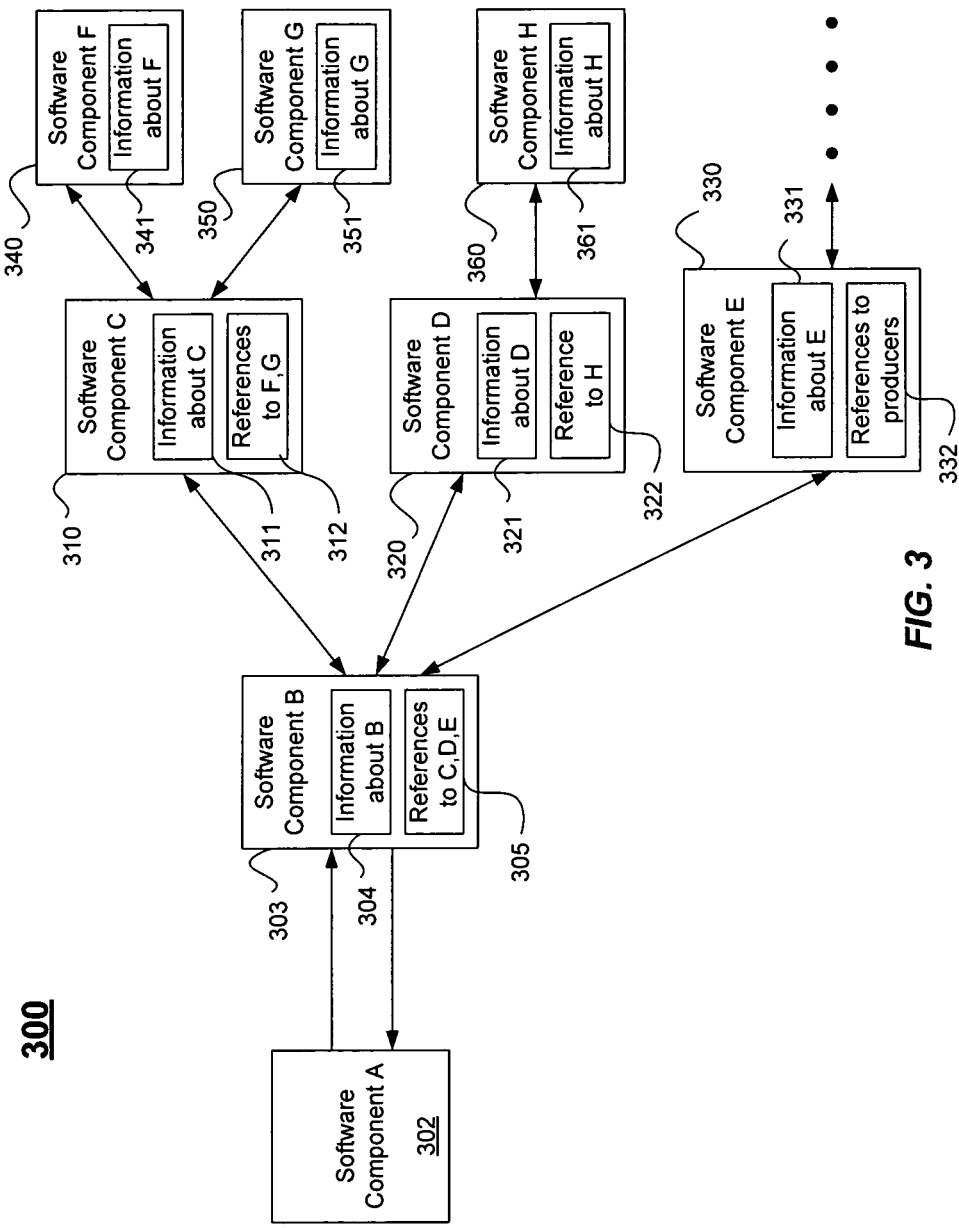
FIG. 3 illustrates accessing information across distributed software components according to one embodiment of the present invention.

FIG. 3 illustrates accessing information across distributed software components according to one embodiment of the present invention. Distributed computing system 300 includes a software component 302 ("component A") that receives inputs from another software component 303 ("component B"). Component A may send information to component B for processing, for example. Because component A receives inputs from component B, component A is referred to herein as a consumer. Because component B provides inputs to component A, component B is referred to herein as a producer. When a first component accesses or uses the functionality of a second component, the first component is said herein to "consume" the second component. In this example, component B receives inputs from component 310 ("component C"), component 320 ("component D"), and component 330 ("component E"). Component C, in turn, receives inputs from component 340 ("component F") and component 350 ("component G"). Similarly, component D receives inputs from component 360 ("component H"). Components C-E are referred to herein as downstream components to components A and B because they provide inputs that are used directly or indirectly by components A and B. Component E may receive inputs from any arrangement of downstream components.

Embodiments of the present invention allow upstream components, such as component A, to access information from downstream components, such as components C-E. For example, component A may access information from software component B because these components are directly coupled together. However, components C-E are not directly coupled to component A. Component A may have no information that components C-E even exist. In one embodiment of the present invention, a software component may include its own information, and may further include references to information for each producer software components that it receives inputs from. Accordingly, software components have a mechanism for accessing information about downstream components that provide both direct and indirect inputs. For example, software component B may include information 304 corresponding to component B and references 305 to information 311, 321, and 331 corresponding to component C, component D, and component E, respectively. Similarly, component C includes information 311 corresponding to component C and references 312 to information 341 and 351 corresponding to components F and G. Components F and G each include information 341 and 351 corresponding to F and G, respectively, and may include references to information corresponding to downstream components if either component receives one or more inputs. Component D includes information 321 corresponding to component D and a reference 322 to information 361 corresponding to component H. Component E includes information 331 corresponding to component E and references 332 to one or more components that provide inputs to component E (i.e., references to one or more producers consumed by component E).

Figure 4:
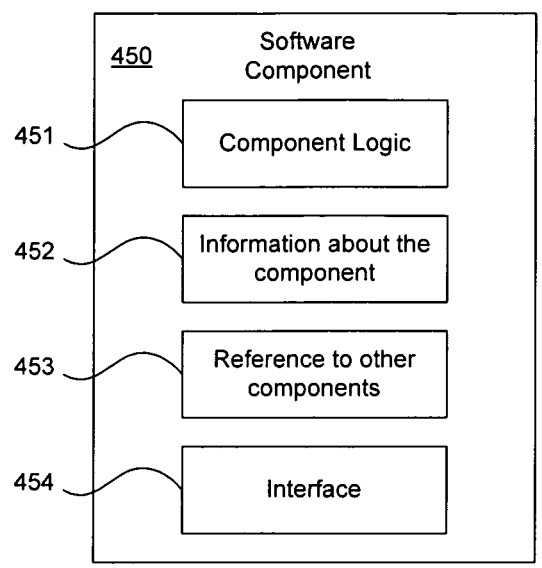
FIG. 4 is an example of a software component according to one embodiment of the present invention.

FIG. 4 is an example of a software component according to one embodiment of the present invention. Software component 450 may include component logic 451, information 452 corresponding to the component, and references 453 to other components. In one embodiment, software component 450 may further include an interface 454. Example implementations of software components may include, but are not limited to, software services (e.g., web services) or instantiated objects having corresponding classes (e.g., implemented in an object oriented programming language such as C++ or Java). Software components according to embodiments of the present invention may be implemented as components of a single program or application or as components of multiple programs or applications. Alternatively, software components may be different remotely accessible stand-alone applications. As used herein, the term program and application are used synonymously to broadly refer to computer software that performs some specified functionality. Component logic 451 is the software for implementing the functionality of the component. Accordingly, logic 451 may include instructions for processing information and implementing the functionality of the component. Logic 451 may be implemented as methods of an object, for example. Information 452 corresponding to the component may include attributes of the object, data formats, the objects structure or functionality, the objects interface, security information, or reliability information, for example, or descriptions thereof. In one embodiment described in more detail below, information 452 may be stored as metadata. References 453 are used to access information in other software components. References 453 may be implemented, for example, as pointers or other equivalent software mechanisms for accessing information in other components. Interface 454 may be used to access logic 451, information 452, or references 453, for example.

Figure 5:
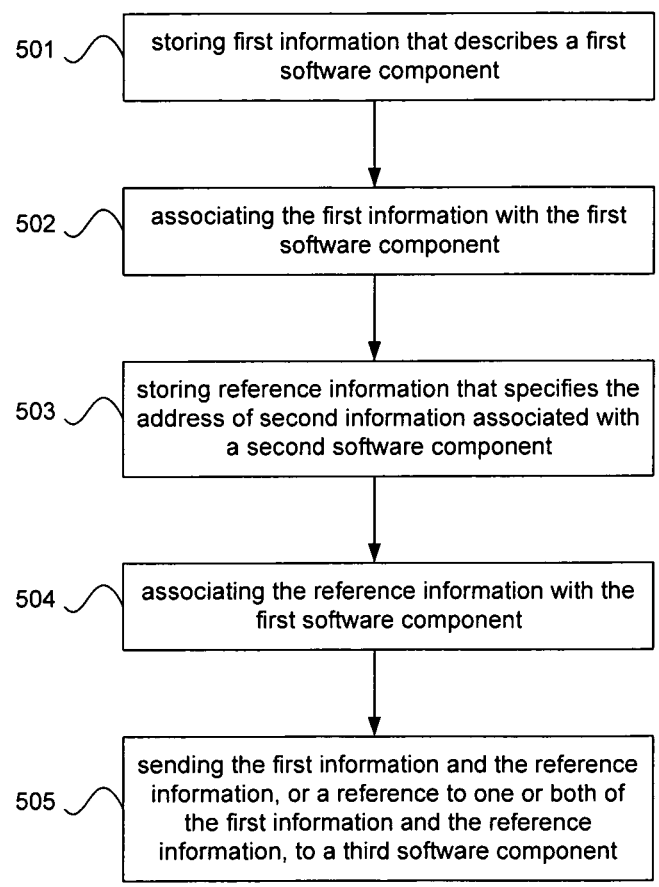
FIG. 5 illustrates a method of accessing information across distributed software components according to one embodiment of the present invention.

FIG. 5 illustrates a method of accessing information across distributed software components according to one embodiment of the present invention. At 501, first information (e.g., information 304) that describes a first software component (e.g., component B) is stored (e.g., in memory). At 502, the first information is associated with the first software component. For example, as described above, the first information may be stored as part of the first software component (e.g., as an attribute), or as described below, the first information may be associated with the first component using yet other references between the first component and the first information. At 503, reference information (e.g., references 305) is stored that specifies the address of second information (e.g., information 311, 321, and/or 331) associated with a second software component (e.g., components C, D, and/or E) that is used by the first software component. At 504, the reference information is associated with the first software component. At 505, the first information (e.g., information 304) and reference information (e.g., references to C, E, and E) are sent to a third software component (e.g., component A). In one embodiment described in more detail below, the first information and reference information are stored externally, and a software component may send references to the first information and reference information.

Figure 6:
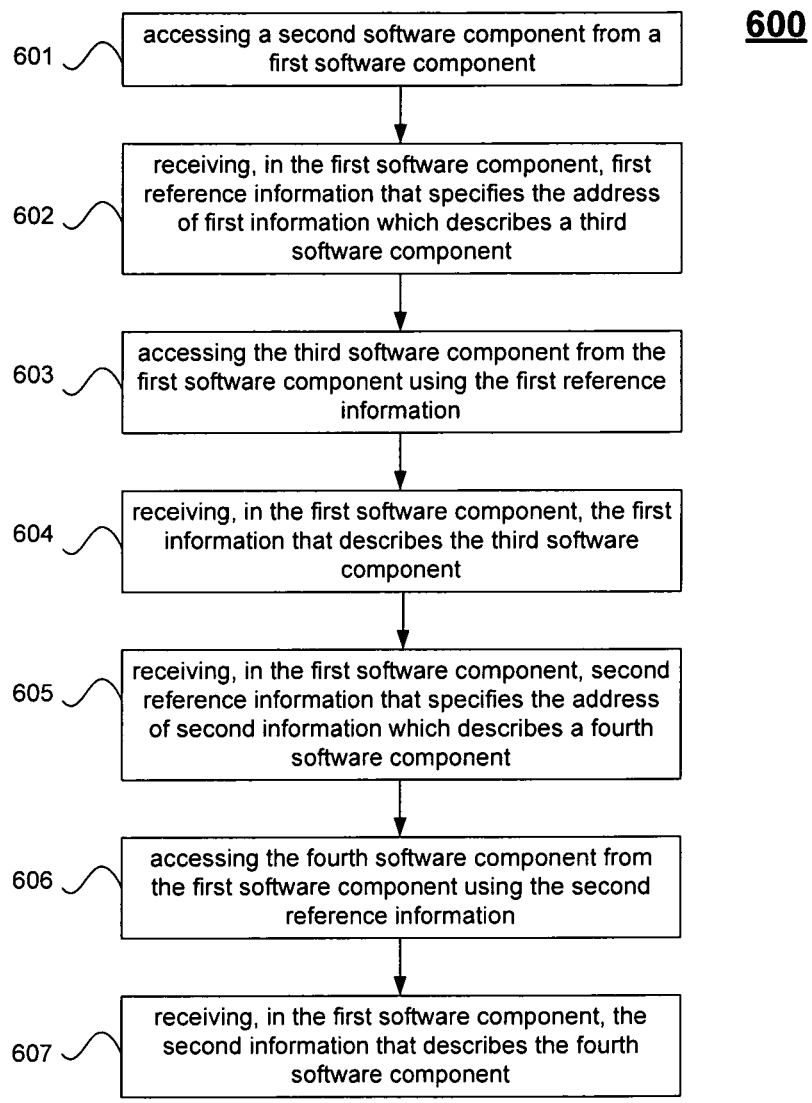
FIG. 6 illustrates a method of accessing information across distributed software components according to another embodiment of the present invention.

FIG. 6 illustrates a method of accessing information across distributed software components according to another embodiment of the present invention. At 601, a second software component (e.g., software component B in this scenario) is accessed from a first software component (e.g., software component A). For example, component A may access component B by issuing a request. At 602, first reference information (e.g., references 305) that specifies the address of first information (e.g., information 311, 321, and/or 331)

which describes a third software component is received in the first software component. For example, in response to a request, component B may send references 305, which specify information corresponding to components C, D, and/or E, to component A. At 603, the first software component uses the reference information to access the third software component. For example, component A may use reference information 305 to access to components 310, 320, and 330 and information 311, 321, or 331 corresponding to each component. At 604, the first information which describes the third software component is received in the first software component. For example, information 311, 321, and/or 331, which describes components C, D, and E, respectively, may be received by component A. Accordingly, software component A may access information about downstream software components that are used indirectly.

In some embodiments, the first software component may receive additional references from downstream components so that further information about downstream components can be obtain regardless of how far removed such components may be. At 605, the first software component may receive second reference information that specifies the address of second information which describes a fourth software component. For example, referring again to FIG. 3, component A may receive a reference 322 to information about component H. At 606, the first software component accesses the fourth software component using the second reference information. Accordingly, component A may access information 361 from component H. At 607, the second information that describes the fourth software component is received by the first software component. In the example of FIG. 3, component A may receive information 361. Using the above technique, component A may obtain information corresponding to any downstream component (e.g., components B-E) that provides inputs, either directly or indirectly, to component A.

Figure 7:
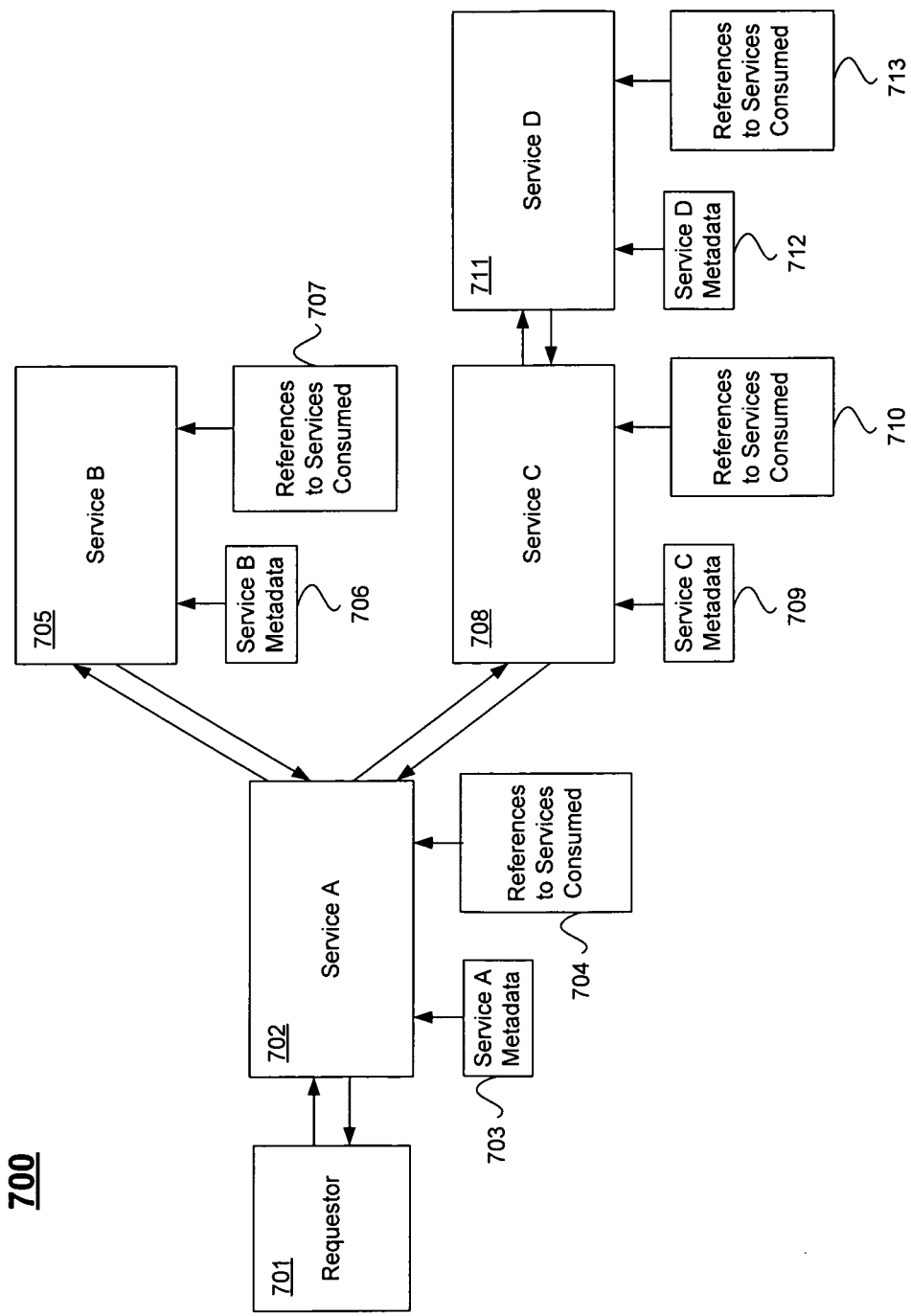
FIG. 7 is an example system for accessing information across software services according to another embodiment of the present invention.

FIG. 7 illustrates one example of a software system incorporating one embodiment of the present invention. This example illustrates an implementation of the invention wherein the software components are software services. Examples of software services include, but are not limiting to, web services. Software service components may expose an interface that allows a requestor component 701 to use the functionality of the service. For example, service 702 ("service A") may store information about the service as metadata 703. The term metadata generally refers to "data about data," but is use herein to also include data that describes a software component, such as a service. When requester 701 wants to use the functionality of service A, it may issue a request to service A. In response to the request, service A may respond by sending its metadata, which may describe how to use the service. The requesting component may use the metadata to access particular functionality of service A. For example, the metadata may describe an interface for accessing one or more of service A's features (e.g., methods), how to call the service, which data formats should be used for sending inputs to service A (e.g., data or messages), and how to read service A's output. Additionally, the metadata may describe other properties of the service, such as reliability assurances, or security constraints, for example. Once requestor 701 has this information, it may access service A and receive inputs from service A. The inputs may result from information sent to service A by the requester (e.g., a request to process a job), for example.

Service A may further include references to services consumed by service A. For example, service A may include a list of pointers or a logical or physical address (e.g., a network address) to service 705 (service B) and service 708 (service C). The pointers or addresses may be stored as metadata (i.e., as a "metadata address"). Reference information may be represented in XML or as a web service description language ("WSDL"), for example. When the requestor 701 issues a request to service A, service A may respond by sending metadata 703 that describes the service and references 704 to metadata for service B and service C. Requestor 701 may use the references to access metadata 706 for service B. If service B uses other downstream services, service B may return references to information that describes such services to requestor 701. Requestor 701 may further use references 704 to access metadata 709, which describes service C, and a reference 710 to access information about service D, which provides inputs to service C. Requestor 701 may access metadata 712 using reference 710, and may further access additional references 713, if any, to any services used by service D. As mentioned above, each service's metadata may be comprised of the list of pointers. For example, Service A's metadata may include a list of pointers to services consumed by Service A. This list allows the requestor to make requests to services further downstream. By making references to consumed services available in each service, the requestor 701 may now be able to communicate with all the services consumed downstream from Service A. In one embodiment described in more detail below, requestor 701 may recursively access and iterate through the list of pointers returned by each downstream service to obtain access to service B's metadata, service C's metadata, and service D's metadata, and metadata for any other service indirectly consumed by the requester.

Figure 8:
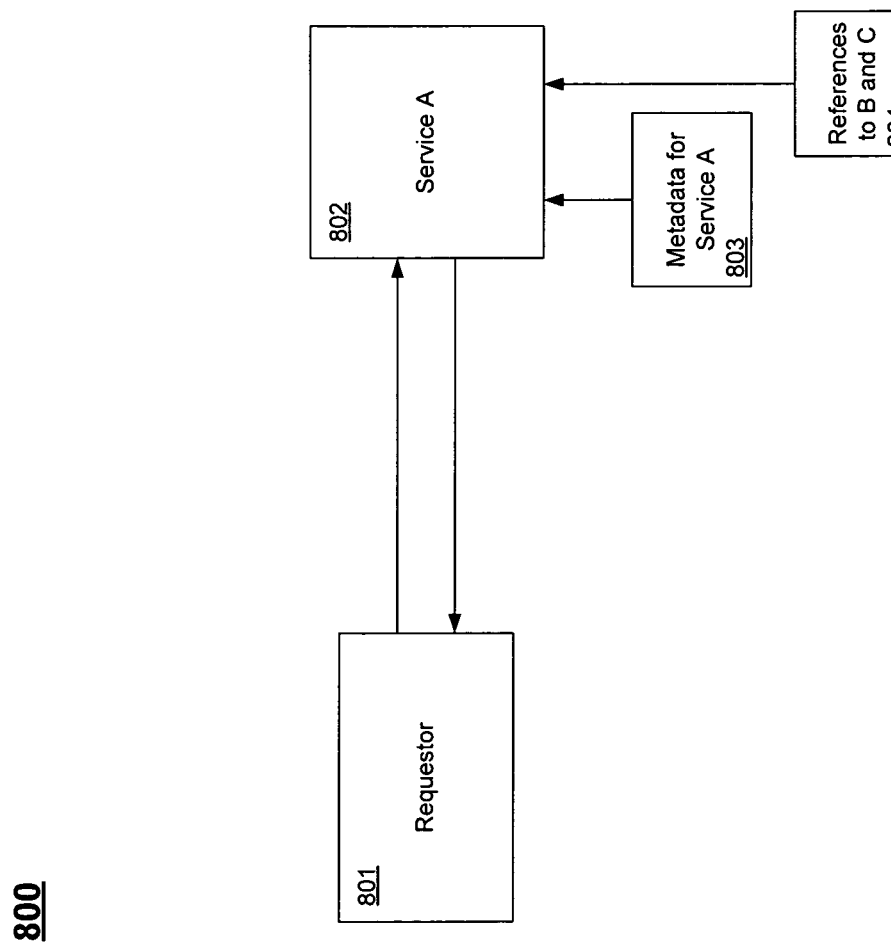
FIG. 8 is an example of accessing associated information according to one embodiment of the present invention.

FIG. 8 is an example of accessing associated information according to one embodiment of the present invention. In this example, the information and references are stored with the software component. The requestor 801 sends a request to service A 802 to access the metadata for service A 803. For example, service A may use a WS-Metadata Exchange ("WS-MEX") protocol and send a SOAP message containing a "GetMetadata" request to a web service. The request may include restrictions as to which type of metadata (referred to herein as a "dialect") to return. After receiving the request, service A returns the requested metadata 803 in a response message or an empty response message if there is no metadata matching the request. Additionally, service A returns references to metadata for services B and C, which are consumed by service A. The requestor 801 may then access downstream services B and C, and any other downstream services consumed by B and C.

Figure 9:
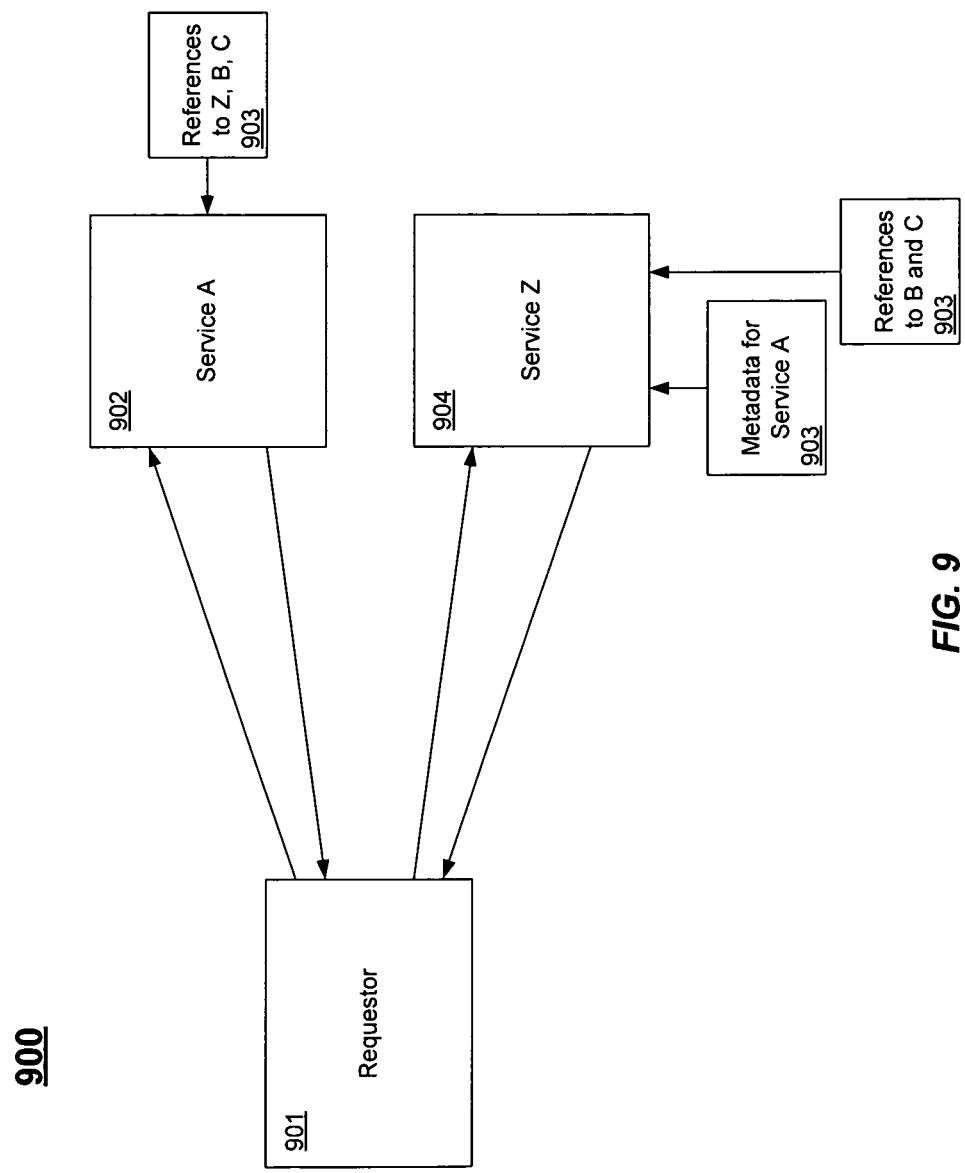
FIG. 9 is an example of accessing associated information according to another embodiment of the present invention.

FIG. 9 is an example of accessing associated information according to another embodiment of the present invention. In this example, the information and references are associated with software component 902, but stored with another software component 904. For example, service Z 904 may store metadata associated with service A 902. Service A may include a reference to service Z so consumers of service A know where to get service A's metadata. References 903 to metadata for services consumed by service A may be either stored with service A or with service Z. The requestor 901 sends a request to service A, and service A responds by sending back an address of the service (here, service Z) from which the metadata for service A may be obtained. Service A may send back references to metadata for services B and C. The requestor can then use the address as a destination for sending a request (e.g., a SOAP get message). After Service Z receives the get message, it responds by sending the metadata for Service A and may send the references to services B and C if they are stored there.

Figure 10:
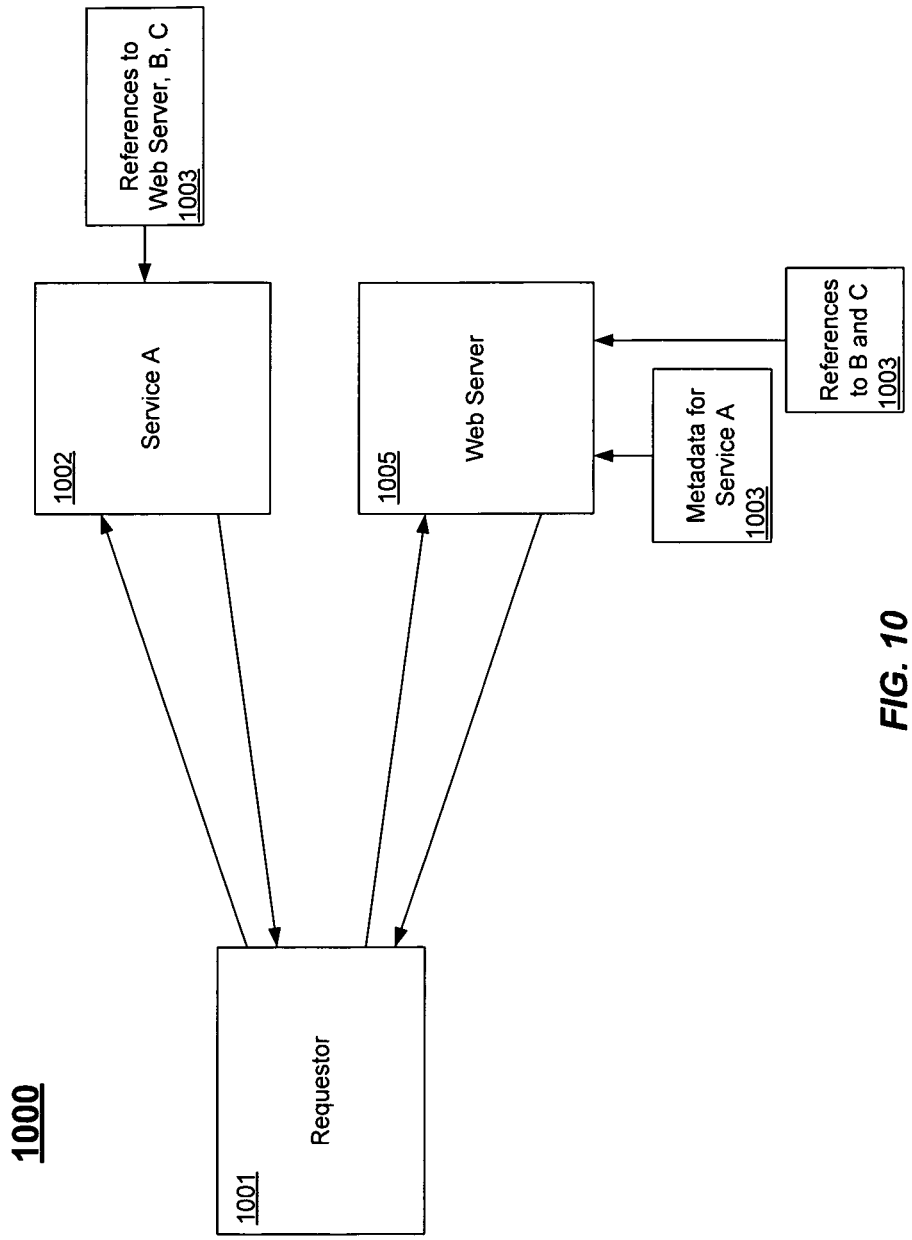
FIG. 10 is an example of accessing associated information according to yet another embodiment of the present invention.

FIG. 10 is an example of accessing associated information according to yet another embodiment of the present invention. In this example, the information and references are associated with software component 1002, but stored with a web server 1005. For example, web server 1005 may store metadata 1003 associated with service A. Service A may include a reference, such as a URL, to web server 1005 so consumers of service A know where to get service A's metadata. References 1003 to metadata for services consumed by service A may be either stored with service A or with web server 1005. The requester 1001 sends a request to Service A. Service A may respond with a URL with which the requester can download the metadata for Service A by using the HTTP GET operation, thereby downloading the metadata from web server 1005. The requester may also use the URL to download the references to services B and C if such references are stored on the web server rather than on service A.

In one embodiment, the present invention includes a new type, "reference," created for the purpose of assisting the retrieval of data, or metadata, from downstream software components. The new type contains a unique classification to distinguish itself from other types. Accordingly, requester components may request each type with specificity and obtain the reference information. The new type may be a metadata type, for example. An example implementation in XML is as follows:

```
<ns:ConsumedServices>
    <wsa:EndpointReference>
    ...
    </wsa:EndpointReference>
    <wsa:EndpointReference>
    ...
    </wsa:EndpointReference>
</ns:ConsumedServices>
```

In this example, the new type is represented as a new XML namespace created for representing one or more references. The references are implemented using a new metadata type, which in this example includes a list of XML EndPoint References (EPR). In the example above, the list contains two references, but the list could contain more or less. Zero elements in the list indicates that the service does not consume any downstream services. The type may be classified or represented using a Universal Resource Indicator ("URI") (e.g., "http://schema.xmlsoap.org/ws/2005/10/providerauditing"). It is to be understood that any particular URI may be selected. By assigning the metadata a new type, different types of metadata (i.e., dialects) may be retrieved from a software service, such as a web service.

One application of the techniques describe herein is auditing software services. One disadvantage of software services is that software service providers, who use third party software services as downstream components, lose visibility and control over how some parts of their software are executed. A well-executed software service outsourcing strategy therefore must include a strong auditing component. The practice of being able to audit providers, and audit the providers that the providers themselves use, unfortunately is not readily automated in the world of software services. In fact, one aspect of software services and web service in particular, and distributed computing in general, is to only expose to the consumer an interface, and hide the implementation away from the consumer. Embodiments of the present invention allow software components in general, and software services in particular, to perform automated auditing via a chain of references that may be accessed to obtain information about downstream components and services.

Figure 11:
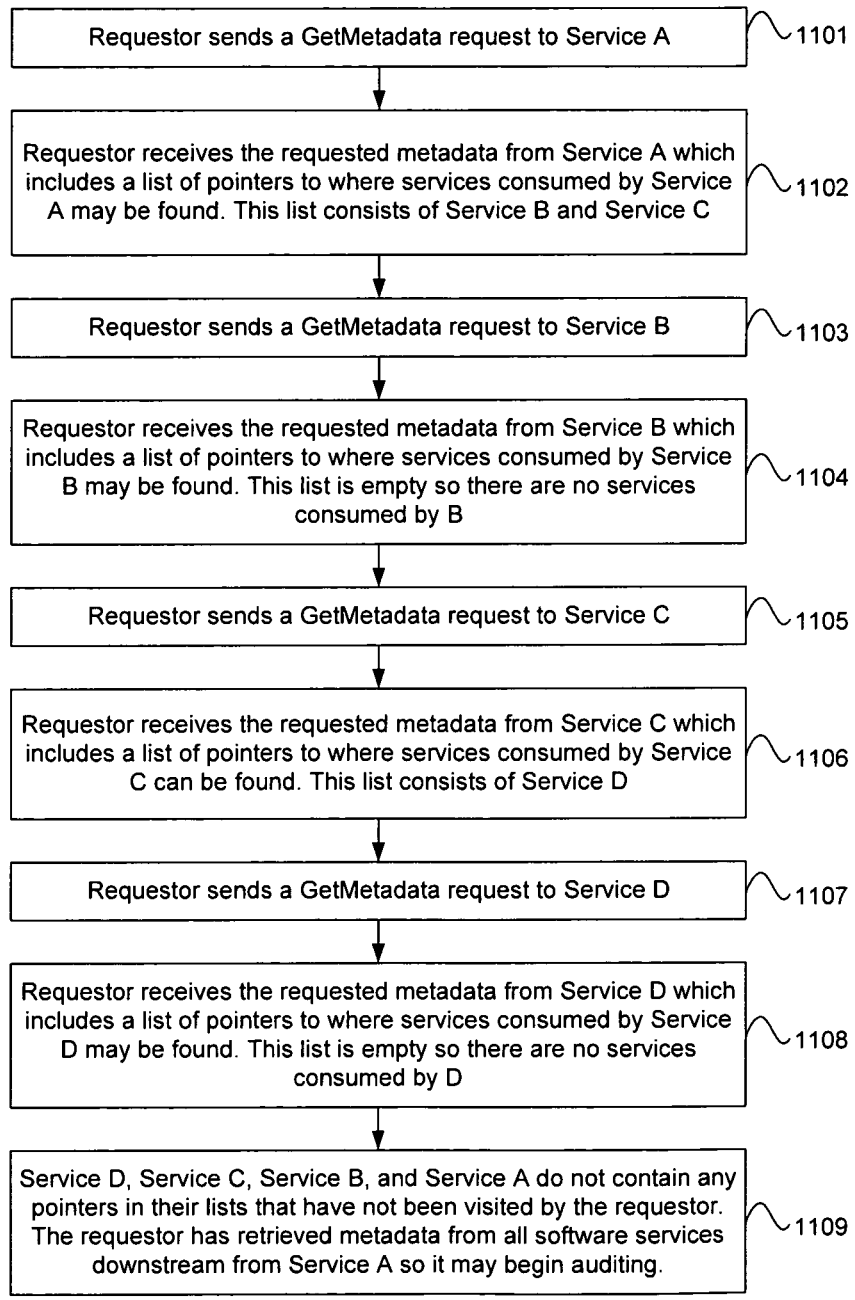
FIG. 11 is an example process of accessing information across software services according to one embodiment of the present invention.

FIG. 11 is an example process of accessing information across software services according to one embodiment of the present invention. The steps illustrated here are based on the system shown in FIG. 7. Service requestor 701 wishes to audit a distributed software system. At step 1101, the requestor 701 sends a request to service A 702 for service A's metadata 703, which includes the new data type described above. The method used to request and receive metadata is entirely up to the user. Examples of methods that may be used are those shown in FIGS. 8, 9, and 10. At step 1102, the requestor receives the metadata from service A. In this example, the metadata includes a list of pointers to where services consumed by service A may be found. This list consists of service B 705 and service C 708. The requestor begins to process the list of pointers to retrieve metadata belonging to services consumed by service A. At step 1103, the requester sends a request to the first pointer, service B 705, for service B's metadata 706. At step 1104, the requestor receives service B's metadata, which may include the list of pointers 707 if service B is a consumer. In FIG. 7, this list of pointers is empty, indicating that service B is an independent service so there are no services consumed by service B. At step 1105, the requestor continues to the next pointer and sends a request to service C 708 for service C's metadata 709. At step 1106, the requestor receives service C's metadata, which includes the list of pointers 710. This list of pointers consists of a pointer to service D 711. At step 1107, the requestor sends a request to service D 711. At step 1108, the requester receives service D's metadata, which includes a list of pointers 713. This list of pointers is empty, indication that service D is an independent service so there are no services consumed by service D. At step 1109, the requester has processed all the pointers downstream of service A. All of the lists contain no pointers that have not been visited by the requestor. Having now acquired all the required metadata, the requestor may now begin its auditing applications by processing the metadata associated with each downstream service.

FIG. 12 illustrates example pseudo-code for accessing information recursively according to one embodiment of the present invention. FIG. 12, at 1210, describes the main function used to retrieve the information from the software services consumed by the requestor. The function comprises calling the audit_service function for each of the software services consumed by the requester, as illustrated at 1211. FIG. 12, at 1220, describes the audit_service function used to recursively visit every software service consumed downstream by the requester. It will first request a data set (metadata or references, or both) from the software service, as illustrated at 1221. It will then receive the requested data set from the software service, as illustrated at 1222. If the data set contains a list of pointers, then we will recursively call the audit_service function for each of the software services pointed to by the pointers in the list, as illustrated at 1223. It will be evident to one skilled in the art that this embodiment is just one of many algorithms that may be applied to visit every software service consumed by the requestor, either directly or indirectly. Other methods include, but are not limited to, list algorithms, tree algorithms, and search algorithms. It will be evident to one skilled in the art that by recursively following the list of pointers, a tree structure will form where the software service making the request is the head of the tree and all consumed software services are branches and leaves of the tree. The leaves of this tree will be populated by software services that do not consume other software services. This tree structure allows a software service to audit or perform a search across the software systems it consumes, both directly and indirectly, by collecting the information from the branches and leaves of this tree. The methods and steps used to collect this information may vary based on the protocols used by the service provider and service consumer.

Figure 13:
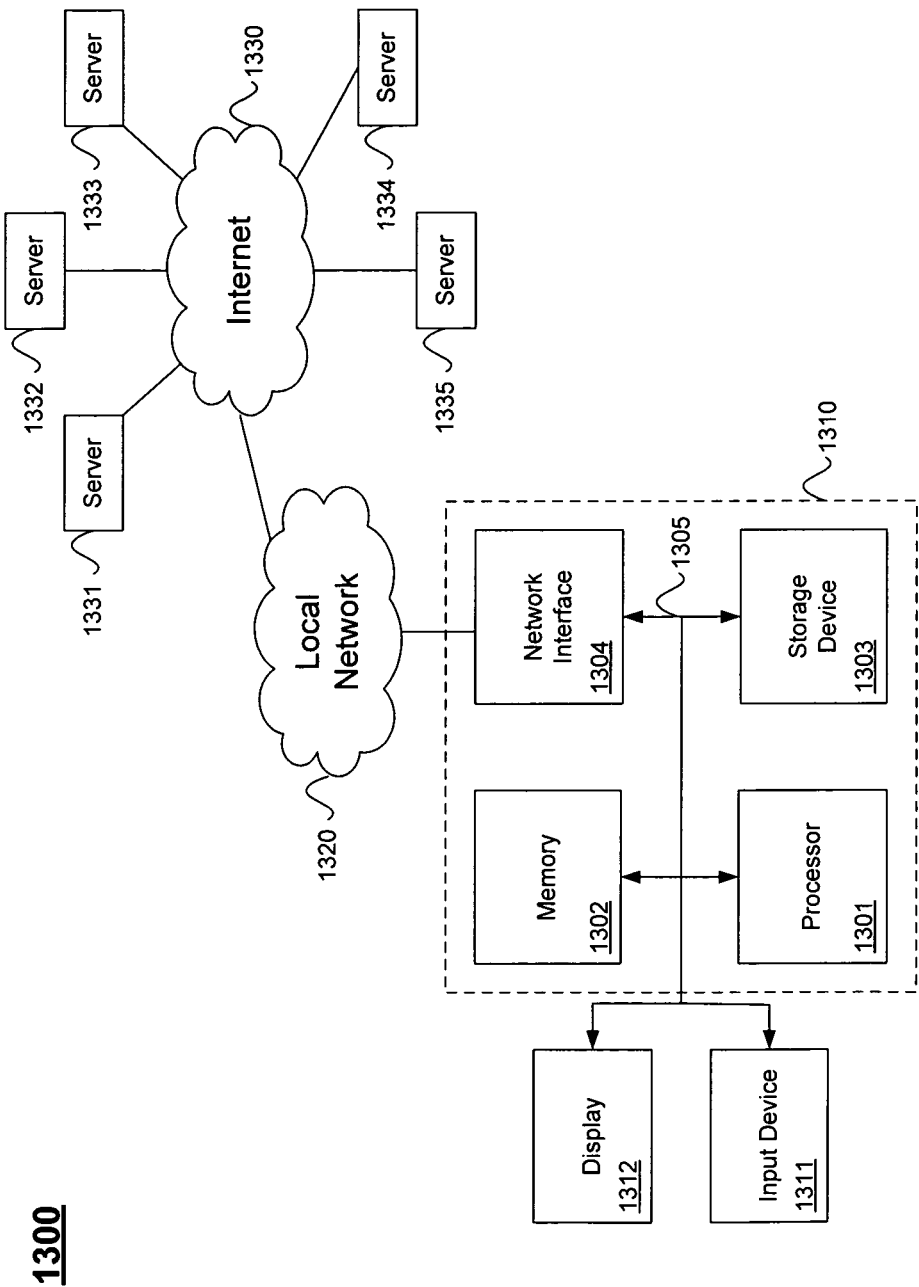
FIG. 13 illustrates an example computer system and networks that may be used to implement the present invention.

FIG. 13 illustrates an example computer system and networks that may be used to implement the present invention. Computer system 1310 includes a bus 1305 or other communication mechanism for communicating information, and a processor 1301 coupled with bus 1305 for processing information. Computer system 1310 also includes a memory 1302 coupled to bus 1305 for storing information and instructions to be executed by processor 1301. This memory may also be used for storing temporary variables or other intermediate information during execution of instructions to be executed by processor 1301. Possible implementations of this memory may be, but are not limited to, random access memory (RAM), read only memory (ROM), or both. A storage device 1303 is also provided for storing information and instructions. Common forms of storage devices include, for example, a hard drive, a magnetic disk, an optical disk, a CD-ROM, a DVD, a flash memory, a USB memory card, or any other medium from which a computer can read.

Computer system 1310 may be coupled via bus 1305 to a display 1312, such as a cathode ray tube (CRT) or liquid crystal display (LCD), for displaying information to a computer user. An input device 1311 such as a keyboard and/or mouse is coupled to bus 1305 for communicating information and command selections from the user to processor 1301. The combination of these components allows the user to communicate with the system.

Computer system 1310 also includes a network interface 1304 coupled with bus 1305. Network interface 1304 may provide two-way data communication between computer system 1310 and the local network 1320. The network interface 1304 may be a digital subscriber line (DSL) or a modem to provide data communication connection over a telephone line. Another example of the network interface is a local area network (LAN) card to provide a data communication connection to a compatible LAN. Wireless links is also another example. In any such implementation, network interface 1304 sends and receives electrical, electromagnetic, or optical signals that carry digital data streams representing various types of information.

Computer system 1310 can send and receive information, including metadata and references, through the network interface 1304 to an Intranet or the Internet 1330. In the Internet example, software components or services may reside on multiple different computer systems 1310 or servers 1331 across the network. A server 1331 may transmit requested information and references from one component, through Internet 1330, local network 1320, and network interface 1304 to a component on computer system 1310. The information or references may then be sent to the processor 1301 via bus 1305. The received information or references may then be processed by processor 1301 and/or stored in storage device 1303, or other non-volatile storage for later execution. This process of sending and receiving information may be applied to communication between computer system 1310 and any of the servers 1331 to 1335 in either direction. It may also be applied to communication between any two servers 1331 to 1335.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A computer-implemented method of accessing information from one or more software components comprising:
    storing first information that describes a first software component;
    associating the first information with the first software component;
    storing reference information that specifies the address of second information associated with a second software component, wherein the second information describes the second software component;
    associating the reference information with the first software component; and
    sending the first information and the reference information to a third software component,
    wherein the first software component provides one or more inputs to the third software component and the third software component consumes the first software component, and the first software component receives one or more inputs from the second software component and the first software component consumes the second software component, and
    wherein the third software component sends third information to the first software component for processing, and wherein the first software component and at least the second software component perform distributed computing of said third information, and
    wherein the third software component audits software components performing said distributed computing by sending a first request to the first software component, and in accordance therewith, the third software component receives the first information and the reference information and uses the reference information to iteratively retrieve information describing downstream software components including said second information describing the second software component.

2. The method of claim 1 wherein the third software component uses at least a portion of the functionality of the first software component.

3. The method of claim 1 wherein the first software component uses at least a portion of the functionality of the second software component.

4. The method of claim 1 wherein the first software component and the second software component are remotely accessible applications.

5. The method of claim 1 wherein the first software component, the second software component, and the third software component are instantiated objects having corresponding classes.

6. The method of claim 1 wherein the first software component and the second software component are components of a single software program.

7. The method of claim 1 wherein the first software component and the second software component are software services.

8. The method of claim 7 wherein the first software component and the second software component are web services.

9. The method of claim 1 wherein the first software component is a software service, the first information is metadata that describes the first software service, and the reference information comprises one or more pointers to other software services consumed by the first software service.

10. The method of claim 1 wherein the first software component includes the first information and the reference information, and wherein the method further comprises sending the first information and the reference information from the first software component to the third software component in response to said request from the third software component.

11. The method of claim 1 wherein the first information is stored external to the first software component, wherein the first information is associated with the first software component using a reference to the first information, wherein the reference is stored with the first software component, and wherein the first software component sends the reference to the third software component.

12. The method of claim 1 wherein the reference information is stored external to the first software component, wherein the reference information is associated with the first software component using a reference to the reference information, wherein the reference is stored with the first software component, and wherein the first software component sends the reference to the third software component.

13. The method of claim 1 wherein the reference information is an address.

14. The method of claim 1 wherein the reference information is represented in XML.

15. The method of claim 1 wherein the reference information is represented in a web service description language.

16. The method of claim 1 further comprising receiving a request in the first software component from the third software component, wherein the request includes a restriction on a type of information to be accessed, and wherein the type is a reference type.

17. The method of claim 16 wherein the restriction comprises a unique resource identifier.

18. The method of claim 1 wherein the reference information is used by the third software component to access information that describes an interface for one or more software components consumed by the first software component.

19. The method of claim 1 wherein the reference information is used by the third software component to access information that describes one or more data formats for one or more software components consumed by the first software component.

20. The method of claim 1 wherein the reference information is used by the third software component to access reliability information for one or more software components consumed by the first software component.

21. The method of claim 1 wherein the reference information is used by the third software component to access security information for one or more software components consumed by the first software component.

22. The method of claim 1 wherein the reference information is used by the third software component to access attributes of one or more software components consumed by the first software component.

23. The method of claim 1 wherein the reference information is used by the third software component to access second reference information, and wherein the second reference information specifies one or more addresses for information that describes a corresponding one or more software components consumed by the second software component.

24. A computer-implemented method of accessing information from one or more software services comprising:
receiving a request from a first software service in a second software service, wherein the second software service is consumed by the first software service; and
sending first metadata and first reference information from the second software service to the first software service in response to the request, wherein the first metadata describes the second software service and the first reference information specifies the address of second metadata that describes a third software service consumed by the second software service,
wherein the first software service sends first information to the second software service for processing, and wherein the second software service and at least the third software service perform distributed computing of said first information, and
wherein the first software service audits software services performing said distributed computing by sending said request, and in accordance therewith, the first software service receives the first metadata and the first reference information and uses the first reference information to iteratively retrieve metadata describing downstream software services including said second metadata that describes the third software service.

25. The method of claim 24 wherein the first reference information is used by the first software service to access information that describes an interface for one or more software service consumed by the second software service.

26. The method of claim 24 wherein the first reference information is used by the first software service to access information that describes one or more data formats for one or more software services consumed by the second software service.

27. The method of claim 24 wherein the first reference information is used by the first software service to access reliability information for one or more software services consumed by the second software service.

28. The method of claim 24 wherein the first reference information is used by the first software service to access security information for one or more software services consumed by the second software service.

29. The method of claim 24 wherein the first reference information is used by the first software service to access attributes of one or more software services consumed by the second software service.

30. The method of claim 24 wherein the first reference information is used by the first software service to access second reference information, and wherein the second reference information specifies one or more addresses for information that describes a corresponding one or more software services consumed by the third software service.

31. The method of claim 24 wherein the first reference information comprises one or more pointers.

32. The method of claim 31 wherein the first reference information comprises a type classification for distinguishing the first reference information from other information.

33. The method of claim 31 wherein the first reference information is represented in XML.

34. The method of claim 24 wherein the first software service, the second software service, and the third software service are web services.

35. A computer-implemented method of accessing information across software components comprising:
- accessing a second software component from a first software component, wherein the first software component consumes the second software component;
- receiving, in the first software component, first reference information that specifies the address of first information, wherein the first information describes a third software component, wherein the second software component consumes the third software component, and wherein the third software component provides one or more inputs to the second software component;
- accessing, by the first software component, the third software component using the first reference information; and
- receiving, in the first software component, the first information that describes the third software component,
- wherein the first software component sends information to be processed to the second software component for processing, and wherein the second software component and at least the third software component perform distributed computing of said information to be processed, and
- wherein the first software component audits software components performing said distributed computing by sending a request to the second software component, and in accordance therewith, the first software component receives the first reference information and uses the first reference information to iteratively retrieve additional information describing downstream software components including said first information that describes the third software component.

36. The method of claim 35 further comprising receiving second information that describes the second software component.

37. The method of claim 35 further comprising:
- receiving second reference information from the third software component that specifies the address of second information, wherein the second information describes a fourth software component, and wherein the fourth software component provides one or more inputs to the third software component;
- accessing the fourth software component using the second reference information; and
- receiving the second information that describes the fourth software component.

38. The method of claim 37 wherein the first software component, the second software component, the third software component, and the fourth software component are software services.

39. The method of claim 37 wherein the first software component, the second software component, the third software component, and the fourth software component are web services.

40. The method of claim 35 wherein the first software component accesses the second software component by sending said request, and the first software component accesses the third software component by sending a second request.

41. The method of claim 35 wherein the first reference information comprises one or more pointers to the third software component.

42. A computer system including software for accessing information across software components comprising:
- at least one processor and at least one memory; and
- a producer software component comprising:
  - first component logic;
  - first information corresponding to the producer software component; and
  - at least one reference to second information that describes a second software component,
- wherein the producer software component is configured to be consumed by a consumer software component,
- wherein the producer software component is configured to consume the second software component, and
- wherein the at least one reference in the producer software component is configured to be obtained by the consumer software component to access the second information that describes the second software component,
- wherein the consumer software component is configured to send third information to the producer software component for processing, and wherein the producer software component and at least the second software component are configured to perform distributed computing of said third information, and
- wherein the consumer software component is configured to audit software components performing said distributed computing by sending a request to the producer software component, and in accordance therewith, the consumer software component is configured to receive the at least one reference and is configured to use the at least one reference to iteratively retrieve additional information describing downstream software components including said second information that describes the second software component.

43. The computer system of claim 42, the producer software component further comprising an interface for accessing the first component logic, the first information, and the one or more references.

44. The computer system of claim 42 wherein the consumer software component, the producer software component, and the second software component are software services.

45. The computer system of claim 42 wherein first information is metadata that describes the producer software component and the at least one reference is a pointer for accessing information in the second software component.

46. The computer system of claim 42 wherein the consumer software component, the producer software component, and the second software component are web services.

* * * * *